United States Patent [19]
Takahashi et al.

[11] Patent Number: 5,679,480
[45] Date of Patent: Oct. 21, 1997

[54] LITHIUM SECONDARY BATTERY EMPLOYING A NON-AQUEOUS MEDIA

[75] Inventors: Yuzuru Takahashi, Tsukuba; Hideo Yamada, Tokyo, both of Japan

[73] Assignee: Mitsubishi Gas Chemical Company, Inc., Tokyo, Japan

[21] Appl. No.: 279,951

[22] Filed: Jul. 25, 1994

[30] Foreign Application Priority Data

Jul. 26, 1993 [JP] Japan .................. 5-184066

[51] Int. Cl.$^6$ ............................................ H01M 4/58
[52] U.S. Cl. .................. 429/218; 429/212; 429/217; 429/213; 423/364; 423/414; 423/419.1; 423/593; 252/512; 29/623.1
[58] Field of Search .................. 429/218, 212, 429/217, 213; 252/512; 29/623.1; 423/364, 593, 599, 414, 419.1

[56] References Cited

U.S. PATENT DOCUMENTS

| 4,615,959 | 10/1986 | Hayashi et al. | 429/194 |
| 5,093,216 | 3/1992 | Azuma et al. | 429/218 |
| 5,162,176 | 11/1992 | Herr et al. | 429/194 |
| 5,294,498 | 3/1994 | Omaru et al. | 429/122 |
| 5,326,658 | 7/1994 | Takahasi et al. | 429/194 |

FOREIGN PATENT DOCUMENTS

| 3-245458 | 11/1991 | Japan . |
| 5-258743 | 10/1993 | Japan . |
| 6-132031 | 5/1994 | Japan . |

*Primary Examiner*—Bruce F. Bell
*Attorney, Agent, or Firm*—Leydig, Voit & Mayer, Ltd.

[57] ABSTRACT

A lithium secondary battery employing a non-aqueous media in which the carbonaceous anode material is prepared by the calcination of an organic compound obtained by reacting a precursor organic compound with a lithium salt.

16 Claims, No Drawings

LITHIUM SECONDARY BATTERY EMPLOYING A NON-AQUEOUS MEDIA

BACKGROUND OF THE INVENTION

1. Field of the Invention

The present invention relates to an improved lithium secondary battery employing a non-aqueous media and exhibiting superior capacity and charge-discharge characteristics.

2. Description of the Prior Art

Lithium secondary batteries using carbonaceous materials as anode materials have already been used to obtain such advantages as high energy density, lightness and compactness and storability over long periods.

However, in response to the trend toward miniaturization of electronic devices, it is necessary to improve the extent to which it is possible to realize higher capacities.

For example, as proposals that high capacity be achieved by adjusting the content of elements other than carbon present in the material to optimum levels, Japanese Laid Open Patent Application Numbers 1991-137010 and 1993-74457 disclose carbonaceous materials containing the element phosphorus, and Japanese Laid Open Patent Application Number 1991-245458 discloses a carbonaceous material containing boron, U.S. Pat. No. 5,326,658 discloses as an anode a material having a high capacity comprising a carbonaceous material containing nitrogen made by the calcination of an organic precursor compound obtained by reacting a conjugated polycyclic compound with a nitro-compound or a nitrating agent, and Japanese Laid Open Patent Application Number 1992-278751 discloses a sulfur containing carbonaceous anode material.

However, to realize the potential of an anode material for high capacity during use in a battery to the same extent that it has been realized for these carbonaceous materials when they are used as simple electrodes, it is necessary to reduce or eliminate the capacity loss during the initial charge discharge cycle. In the case where the cathode is made from a compound in which lithium can be stored such as, for example, $LiCoO_2$, to make the anode from carbonaceous materials, it is necessary to charge the battery after assembly, and at this time, the capacity loss is considerable, and the amount of usable lithium decreases making it impossible to achieve a battery having a desirably large capacity.

One solution to the problem of supplying lithium to cover the loss is to include the amount of lithium expected to be lost in the carbonaceous material. For example, before assembling the battery, it is possible to absorb the lithium into the carbonaceous material electrochemically, or, to attach metallic lithium to the carbonaceous material to be placed in the battery before battery assembly according to the method disclosed in Japanese Laid Open Patent Application Number 1985-235372. Additionally, Japanese Laid Open Patent Application Number 1993-67468 proposes a method for making an anode by mixing powdered carbonaceous material and lithium metal powder under a protective gas or under a vacuum. Additionally, there are the methods of impregnating the carbonaceous material with an organo-lithium compound such as n-butyl lithium and then heating it to obtain the anode material or the method of Japanese Laid Open Patent Application Number 1993-258743 in which impregnation is carried out with a lithium halide solution followed by heat treatment to obtain the anode material. However, in each of these methods, it is either necessary to perform the procedures under an atmosphere of inert gas or to increase the number of steps in the procedure. For this reason, these methods are not advantageous from the standpoint of production. Additionally, the use of dangerous organo-lithium compounds is undesirable from the standpoint of safety.

SUMMARY OF THE INVENTION

As stated above, it is necessary to overcome the problem of inadequate capacity or capacity loss experienced with the carbonaceous materials of the prior art with a minimum of added apparatus or additional process steps. The objective of the present invention is to solve the problems of the prior art and by so doing to offer a high performance lithium secondary battery that has greater capacity, improved charge-discharge cycle characteristics and superior stability and safety.

DETAILED DESCRIPTION OF THE PRESENT INVENTION

The inventors of the present invention, to achieve the objectives stated above, attempted to conduct their investigation by adjusting the calcination temperature, degree of crystallinity, and particle surface area of the carbonaceous anode material. However, they were not able, by doing so, to achieve any improvement in the extent of capacity loss that would permit the battery to substantially maintain its capacity.

Then, when the inventors of the present invention calcined a lithium containing compound obtained by adding a lithium salt, such as lithium carbonate, to a precursor organic compound such as pitch, they observed a great improvement in the capacity of the carbonaceous material obtained. In particular, when they calcined mixtures of lithium salts with the reaction products of such conjugated polycyclic compounds as are described in U.S. Pat. No. 5,326,658 and nitrocompounds or nitrating agents, they obtained large battery capacity and a decrease in capacity loss. By using the carbonaceous material thus obtained as an anode material, the inventors of the present invention were able to achieve the objective of making a high performance lithium secondary battery.

The anode material used in the lithium secondary battery of the present invention is a carbonaceous material prepared by calcining a lithium containing compound obtained by adding lithium salts to a precursor organic compound.

The precursor organic compound of the present invention may be an organic polymer or a conjugated polycyclic compound. The organic polymer may be a phenolic resin, a novolak resin, a furfuryl alcohol resin or the like. The conjugated polycyclic hydrocarbon may be a conjugated polycyclic hydrocarbon such as naphthalene, anthracene, pyrene, coronene or the like or their derivatives: a conjugated heteropolycyclic compound such as benzofuran, quinoline, thionaphthalene, silanaphthalene or their derivatives, compounds derived by linking any of the foregoing compounds together: or, additionally, tars, synthetic pitch, coal tar pitch, petroleum pitch, cokes, petroleum or related heavy oils that are composed partially or completely of or contain the foregoing compounds or mixtures thereof. Pitch or tar having a softening point of 170° C. or less are preferred as the conjugated polycyclic compound. Optimization of conditions and pretreatment depending upon the kind of conjugated polycyclic compound are also desirable. For example, where naphthalene is used, it is desirable to synthesize pitch or tar from the naphthalene using HF and $BF_3$ as a catalyst.

Since a carbonaceous material having a large capacity can be obtained therefrom, a precursor organic compound obtained from the reaction of a conjugated polycyclic compound with a nitrocompound or a nitrating agent as disclosed in U.S. Pat. No. 5,326,65 is particularly preferred.

As the nitrocompound of the present invention, aromatic nitrates are preferred, and dinitronaphthalene is particularly preferred. The ratio of the weight of the nitrocompound to the weight of the conjugated polycyclic compound to be used should be, selected by finding the optimum values for the reactants concerned. However, for dinitronaphthalene and pitch, the preferred ratio is roughly from 0.1 to 3, and, in the case of dinitronaphthalene and tar, the preferred ratio is roughly from 0.05 to 2. The temperature of reaction for the nitrocompound and the conjugated polycyclic compound should be the optimum reaction temperature for the particular reactants concerned. These optimum values generally fall within the range of 200° C. to 600° C.

For the nitration reactions using nitrating agents, the usual reactions for nitration of organic compounds may be used. For example, nitration may be conducted by the addition of a mixture of concentrated nitric acid and concentrated sulfuric acid or a mixture of concentrated nitric acid and acetic anhydride or the like. Where a mixture of concentrated nitric acid and concentrated sulfuric acid is used, the ratio of the weight of the nitrating agent to the weight of the conjugated polycyclic compound is roughly from 5:1 to 100:1. and the reaction temperature is usually from 50° C. to 80° C. Moreover, nitration may also be conducted using a mixture of nitrogen dioxide gas and oxygen or air containing ozone. The nitrated product obtained is washed with water to remove the acid and is then dried.

The ratio of the number of nitrogen atoms to the number of carbon atoms (N/C) and the number of nitrogen atoms to the number of oxygen atoms (N/O) included in the precursor organic compound prepared as described above varies depending upon the composition of the reactants and the temperature of reaction, however, usually, the N/C is from 0.01 to 0.3 and N/O is from 0.1 to 3.0.

The lithium salt may be any lithium salt which, when added to the organic precursor compound of the present invention and calcined, achieves an anode material that offers the desired reduction in capacity loss. However, lithium salts, the anion component of which decomposes completely during calcination leaving no residue of elements other than carbon, oxygen, hydrogen or nitrogen in the anode material, such as lithium carbonate, lithium nitrate, lithium hydroxide or the like, have proven particularly effective, and lithium carbonate and lithium nitrate are preferred. Lithium carbonate is particularly preferred. The ratio of the weight of lithium salt to conjugated polycyclic compound should depend on the characteristics of the respective reaction components to produce an anode material with optimum reduction in capacity loss and this can be determined by testing. However, usually, the lithium salt is added in an amount of from about 1 to 15 parts by weight per 100 parts by weight of conjugated polycyclic compound. The reaction temperature is not particularly limited. However, it is preferred that it be at or above the decomposition temperature for the particular lithium salt used. The method for the addition of the lithium salt to the conjugated polycyclic compound is also not particularly limited. However, since its use results in a desirable greater decrease in capacity loss, the method for addition of the lithium salt to the precursor organic compound in a liquid state or semi-liquid state is preferred. One example of this method is the addition of lithium salts to a mixture of anhydrous tar or pitch with a nitrocompound or nitrating agent which mixture has been heated to a temperature above the softening point of the tar or pitch. The amount of lithium included in the lithium containing compound is preferably from a bout 0.1 wt % to 5 wt %.

The carbonaceous material for anode use of the present invention is obtained by calcination of the lithium containing compound under an atmosphere of inert gas. The calcination temperature is between 800° C. to 1800° C., and preferably 1000° C. to 1300° C. The calcination period is from 0.1 hour to 50 hours, and more preferably from 1 hour to 5 hours optimally determined based upon the characteristics of the precursor organic compound and other reactants. The inert gas is preferably nitrogen and is supplied in a continuous flow that, upon exiting, carries away the waste gas of calcination. In place of the inert gas, the process may be conducted under a vacuum may in which case the waste gas is removed as the vacuum is maintained.

The carbonaceous material thus obtained contains lithium in amount s satisfactory to provide the desired capacity reduction. This usually corresponds to a concentration of lithium within the range of from 0.1 wt % to 5 wt % and preferably within the range of 0.3 wt % to 3 wt % of the anode material. Moreover, the carbonaceous material obtained where a nitrogen containing compound such as a nitrocompound or the nitrating agent has been added and reacted with the conjugated polycyclic compound, in addition to lithium, contains nitrogen in appropriate amounts.

The appropriate amount is usually within the range of 0.5 wt % to 6 wt % and preferably within the range of from 0.7 wt % to 4 wt %. Additionally, most of this nitrogen, when observed using x-ray photoelectron spectroscopy, occurs in certain specific forms, the bonding of which generates 2 peaks appearing in the vicinity of 399 eV (more precisely within the range of 398.8±0.4 eV) and 401 eV (more precisely within the range of 401.2±0.2 eV), due to carbon-nitrogen bonding. Of all of the bonding involving nitrogen in the anode material of the present invention, 80% or more is represented by the 2 peaks appearing in the vicinity of binding energies corresponding to 399 eV and 401 eV respectively.

The parameters of crystallinity of the carbonaceous material of the present invention depend upon the structural conditions of the material. However, usually, the inter layer spacing ($d_{002}$) is 3.4 Å or more and the size of the crystallites $Lc_{002}$ is 7.0 Å or more. The true density is in the range of from 1.4 g/cm$^3$ to 2 g/cm$^3$.

The carbonaceous material of the present invention possesses various excellent properties as anode material, and in particular, it alleviates the problem of capacity loss.

Additionally, the carbonaceous material of the present invention obtained from the reaction of a conjugated polycyclic compound with a nitrogen containing compound such as a nitrocompound or a nitrating agent renders a battery with a capacity of more than 500 (mAh/g) as measured against a lithium potential over an interval of 0 to 3 volts (V) after a small capacity loss 20 of 100 mAh/g or less.

The construction of the secondary battery employing a non-aqueous media of the present invention that includes an anode using the carbonaceous material of the present invention as an anode, a cathode, separator, non-aqueous electrolyte and casing as described below.

The method of using the carbonaceous material of the present invention as the anode is not particularly limited.

For example, an electrode may be prepared by mixing a binder with the powdered anode material of the present invention, using a solvent where required, and then pressing the electrode material onto a collector after it has been formed into a sheet or by coating it directly onto the collector. Moreover, as the binder, any type of pitch may be used, and the plate type electrode obtained by calcining a mixture of the pitch with the powdered anode material has been used effectively. The cathode material is not particularly limited. For example, such lithium containing oxides as $LiCoO_2$, $LiNiO_2$, $LiMnO_2$, $LiMn2O_4$ and the like, such oxides as $TiO_2$, $V_2O_5$, $MoO_3$, $MnO_2$, such sulfides as $TiS_2$, FeS, and $MoS_3$ and such selenides as $NbSe_3$, or such conductive polymers as polyacetylene, polyparaphenyene, polypyrrole and polyaniline or activated carbon may be used. The kind of separator that may be used is not particularly limited. For example, the separator may be made of synthetic or glass fiber or natural fiber either unwoven or in the form of cloth, and micro porous resin and the like may also be used.

In the secondary battery employing a non-aqueous media of the present invention, either an organic liquid or solid electrolyte may be used. A solution of a lithium salt dissolved in an organic solvent having a high dielectric constant may be used. The kind of lithium salt that may be used is not particularly limited, and for example, $LiClO_4$, $LiPF_6$ or $LiSbF_6$ may be used either singly or as mixtures of two or more in appropriate proportions. The organic solvent that may be used for the electrolyte is one that is able to dissolve the applicable lithium salt or salts and preferably is non-protic and has a high dielectric content, and nitriles, carbonates, ethers, nitrocompounds, sulfur containing compounds, chlorinated compounds, ketones, esters and the like may be used. More concretely, for example, acetonitrile, propionitrile, propylenecarbonate, ethylenecarbonate, diethylcarbonate, dimethylcarbonate, tetrahydrofuran, dioxane, 1,2-dimethoxyethane, nitromethane, N,N-dimethylformamide, dimethylsulfoxide, sulfolane, and γ-butyrolactone may be used singly or in mixtures of two or more as mixed electrolytes depending upon the requirements of the particular situation. The battery casing is usually constructed of stainless steel plate or nickel plated material but may also be constructed of multi-layer materials constructed from synthetic resin and insulating inorganic membranes.

The examples of the present invention and comparative experiments are recorded below, and the results are concretely and specifically explained. These examples and comparative experiments are provided for the purpose of concrete explanation of the present invention and do not in any way limit the manner in which the present invention may be practiced or the scope of the present invention. Moreover, the analysis methods and analysis conditions for the anode material to be used in the present invention are recorded below.

Particle Size Distribution Measurement

The equipment used was a Horiba. Ltd. LA-500
1. Laser Diffraction Type Powder Size Distribution Measuring Device.

The measurement was per formed by adding 3 drops of surface ac tire agent to 100 ml of pure water and then adding the sample to this mixture until it reached a predetermined concentration. After subjecting the sample to ultrasonic sound wave dispersion for 10 minutes, the measurement was taken and the median diameter obtained was used as the average particle diameter.

2. Elemental Analysis (excluding lithium)

The analytical equipment used was a PERKIN-ELMER 2400 CHN type elemental analysis device. The measurement was performed by placing 1.5±0.2 mg of the rest anode material in a small tin cup in the instrument, calcining the sample at a temperature of 975° C. for 5 minutes. The measurement was performed by thermal conductivity detection ("TCD") using helium as the carrier gas. To establish correspondence between sample measurements and standard test values, the device was calibrated for the sample using acetanilide (2.0±0.1 mg) as the standard.

A LECO TC-436 type oxygen-nitrogen simultaneous analysis device was used in the simultaneous analysis of nitrogen and oxygen. The analysis was carried out by precisely measuring out 10±0.5 mg of anode material into a nickel vessel, and after calibrating the equipment, heating the sample in a graphite crucible by application of 4800 W of electricity.

Using helium as the carrier gas, the gas generated by heating the sample was analyzed by infrared spectroscopy. To establish correspondence between sample measurements and standard test values, the device was calibrated for the sample using silicon nitride powder having a 1.67% oxygen content (manufactured by Nihon Ceramics Association) as the standard.

3. Elemental Analysis: Lithium

Analysis of the amount of lithium contained was conducted by means of inductively coupled plasma analysis (ICP analysis). The equipment was an SPS-1200 VR type manufactured by Seiko Electronics Industries. Preparation of the sample consisted of reducing the anode material to ash at 900° C. in a muffle furnace, dissolving the residue with concentrated hydrochloric acid, evaporating the liquid portion of the used washing solution and solidifying the residue, redissolving this residue in 1N aqueous hydrochloric acid, and then conducting the measurement. An absolute calibration curve was prepared using standard solutions prepared using determined amounts of lithium.

4. X-ray Photoelectron Spectroscopy Analysis

The equipment used was a V. G. Scientific ESCALAB MK-II. The analysis was performed using Mg-$K_\alpha$ as the x-ray source at 15 KV–20 mA and using an Al slit (2×5 mm). Preparation for analysis consisted of placing the sample on double sided tape. Measurement was conducted with the sample in this condition, or, in some cases, after argon etching of the sample surface. The analysis was performed by measuring each peak precisely within a narrow range after first measuring all of the peaks over broad range and identifying individual peaks. The charge up correction was made by setting the observed carbon 1s energy ("C-1s") at 284.4 eV and adjusting the value for each peak accordingly.

True density was determined by the float and sink method using a carbon tetrachloride-bromoform mixture at 25° C.

EXAMPLE 1

Twenty parts by weight of dinitronaphthalene were added to 80 parts by weight of tar (manufactured by Kawasaki Steel Company) and 5 parts by weight of lithium carbonate at 100° C., the temperature was raised to 400° C. while mixing the three together and a lithium containing compound that was 1.2 wt % lithium was obtained. This compound was powdered using a ball mill. The black powder thus obtained was then calcined for 2 hours at 1000° C. under a stream of nitrogen gas to obtain the powdered anode material. This anode material contained 1.6 wt % of lithium. Moreover, the nitrogen content of this anode material was 0.91 wt % of nitrogen, and the result of XPS measurement was 2 peaks representing binding energies of 401.4 eV and 398.6 eV having an intensity ratio (the intensity of the 401.4 eV peak/the intensity of the 398.6 eV peak) of 2.5 which peaks accounted for 100% of the bonding involving nitrogen observed in the anode material. A flexible shaped article for use as a test electrode was prepared by mixing 100 parts by weight of the powdered anode material thus obtained with 5 parts by weight of polytetrafluoroethylene (binder) and compressing them into a round disk. A half cell was prepared using this test electrode, according to the usual methods, using LiClO$_4$ dissolved in a solvent composed of an equal volume mixture of propylene carbonate and 1,2-dimethoxyethane (concentration of LiClO$_4$: 1.0 mol/l) prepared as an electrolyte and using a separator made from a porous polypropylene membrane with a thickness of 50 µm. As the counter electrode, a 16 mm diameter. 0.5 mm thick disk of lithium metal was used. A small piece of lithium metal similar to the counter electrode was used as the reference electrode.

The first cycle circuit potential of the half cell obtained above was 3.18 V (volts). Subsequently, the half cell was charged at a constant current density of 1.0 mA/cm$^2$ until there was no change in the potential of the test electrode with respect to the reference electrode. The charge capacity was 601 mAh/g. Then, the half cell was discharged at a constant current density of 1.0 mA/cm$^2$, and by the time the electrode reached 0.1 V, the observed discharge capacity was 249 mAh/g, by the time the electrode potential reached 0.5V, the observed discharge capacity was 386 mAh/g and finally, when discharging had proceeded sufficiently for the electrode potential to reach 3.0 V. the observed discharge capacity was 522 mAh/g. The charge-discharge capacity loss was 79 mAh/g.

Evaluation of the Secondary Battery

A test electrode with a thickness of 0.3 mm, a diameter of 15 mm and a weight of 90 mg prepared by the same methods as the above test electrode was used as the anode, and using LiClO$_4$ dissolved in a solvent composed of an equal volume mixture of propylene carbonate and 1,2-dimethoxyethane (LiClO$_4$: 1.0 mol/l) prepared as an electrolyte and using a separator made from a porous polypropylene membrane with a thickness of 50 µm, a secondary battery was prepared. The cathode was prepared by mixing 85 parts by weight of LiCoO$_2$ with 10 parts by weight of acetylene black (conducting agent) and 5 parts by weight of polytetrafluoroethylene (binder) and compressing the mixture into a disk (weight 250 mg and diameter 14 mm).

The circuit voltage for the initial cycle of the secondary battery thus obtained was 0.03 V. When, after charging at a constant current until the charging voltage at a current density of 1.0 mA/cm$^2$ reached 4.10 V, the battery was then discharged at a constant current until the charging voltage at a current density of 1.0 mA/cm$^2$, an initial period charge capacity of 36.0 mAh and an initial discharge capacity of 31.3 mAh were observed. Subsequently, when a constant current charge-discharge cycle experiment was performed with the lower voltage limit set at 2.00 V, the upper voltage limit set at 4.10 V and the current density set at 1.0 mA/cm$^2$, discharge capacities of 30.7 mAh after 40 cycles, 30.5 mAh after 250 cycles and 30.2 mAh after 500 cycles were observed. Moreover, up to 500 cycles, the average discharge voltage of the battery was 3.6 V or more.

COMPARATIVE EXPERIMENT 1

Except that no lithium carbonate was added according to the method disclosed in Example 1, a powdered anode material was obtained by the same methods and using the same materials as in Example 1. The elemental analysis of the anode material thus obtained for nitrogen was 0.91 wt %.

Moreover, according to XPS analysis, 2 peaks based on binding energies of 398.6 eV and 401.4 eV were observed. The ratio of the intensities of these 2 peaks was (the intensity of the 401.4 eV peak/the intensity of the 398.6 eV peak) 2.5, and these 2 peaks accounted for 100% of all bonding involving nitrogen in the anode material.

A test electrode was prepared by sintering a test electrode disk as in Example 1 and when a charge discharge experiment was conducted at constant voltage, the charge capacity was 596 mAh/g. Subsequently, using this test electrode, a half cell was prepared as in example 1 and charge-discharge experiments were conducted at constant current. By the time the electrode potential reached 0.1 V, the observed discharge capacity was 237 mAh/g. By the time the electrode potential reached 0.5 V, the observed discharge capacity was 367 mAh/g and by the time it had reached 3.0 V, the discharge capacity was 496 mAh/g. The charge-discharge capacity loss was 109 mAh/g. Next, a secondary battery was prepared using the same methods as in Example 1, except for the use of the anode material obtained above. When charge-discharge experiments were conducted at constant voltage, the initial period circuit voltage was 0.03 V, the initial period charging capacity was 35.7 mAh and the initial period discharge capacity was 29.7 mAh.

EXAMPLE 2

One mole of naphthalene, 0.5 moles of HF, and 0.5 moles of BF$_3$ were mixed in an acid resistant auto clave with a 500 ml capacity, and, after the temperature was raised to 200° C. and the pressure of the gas was raised to 25 kg/cm$^2$, the reaction was conducted at this temperature and pressure over a period of two hours. Subsequently, nitrogen gas was introduced into the autoclave by the usual methods. This introduction of nitrogen gas also caused the recovery of HF and BF$_3$. By further removal of low boiling Point components, a pitch with a softening point of about 115° C. was obtained.

At a temperature of 120° C., 10 parts by weight of lithium carbonate and 100 parts by weight of dinitronaphthalene were mixed with 100 parts by weight of the pitch having a softening point of 115° C. obtained in this way, after which, the temperature of the mixture was raised to 270° C. until the reaction was completed. The mixture thus heated was cooled and then ground to a powder in a ball mill, and the powder thus obtained was heated at 1000° C. for 2 hours under a stream of nitrogen gas to obtain a powdered anode material.

The amount of lithium contained in the anode material thus obtained was 1.4 wt % and the amount of nitrogen contained was 1.67 wt %. Two peaks based on N-1s with binding energies of 398.6 eV and 401.4 eV were observed by XPS analysis of the anode material. The ratio of the intensities of these two peaks (the intensity of the 401.4 eV peak/the intensity of the 398.6 eV peak) was 2.5. and the two peaks accounted for 100% of the total bonding involving nitrogen.

Moreover, when a half cell and a secondary battery were prepared as in Example 1 using the material prepared in this Example 2 and charge-discharge experiments were conducted at constant current, essentially the same results were obtained in terms of capacity loss improvement as in Example 1.

EXAMPLE 3

Except for the use coal tar pitch having a softening temperature of 110° C. (manufactured by ADCHEMCO Corporation) in place of the pitch obtained by the methods of Example 2, a half cell and a battery were prepared using the same materials and by the same methods as in Example 2, and, when charge-discharge experiments were conducted at constant current, essentially the same results in terms of capacity loss improvement were obtained as in Example 1.

EFFECTS OF THE PRESENT INVENTION

The desirable properties of the secondary battery of the present invention, compared with those of the prior art, are less prone to decrease over time, and the secondary battery of the present invention shows excellent safety and has excellent charge-discharge characteristics in addition to its large apacity.

What we claim is:

1. A method of preparing an anode material for a lithium secondary battery employing a non-aqueous media which comprises providing a mixture of a lithium salt and a precursor organic compound for calcining to obtain an anode material and each present in amounts to provide the anode material, and calcining the mixture under conditions to obtain the anode material.

2. The method according to claim 1, wherein the anion of said lithium salt contains only carbon, oxygen, nitrogen, or hydrogen.

3. The method according to claim 2, wherein said lithium salt is lithium carbonate.

4. The method according to claim 1, wherein the calcined mixture contains from 0.1 wt % to 5 wt % of lithium.

5. The method according to claim 1, wherein the calcined mixture contains from 0.3 wt % to 3 wt % of lithium.

6. The method according to claim 1, wherein said precursor organic compound is obtained by reacting at least one conjugated polycyclic compound with a nitrocompound or with a nitrating agent.

7. The method according to claim 6, wherein said conjugated polycyclic compound is tar or pitch having a softening point of 170° C. or less.

8. The method according to claim 6, wherein said nitrocompound is an aromatic nitrocompound.

9. The method according to claim 8, wherein said aromatic nitrocompound is dinitronaphthalene.

10. The method according to claim 1, wherein calcining is carried out at a temperature in the range of from 800° C. to 1800° C. under an atmosphere of non-reactive gas.

11. The method according to claim 1, wherein the anode material contains nitrogen atoms and from 0.1 wt % to 5 wt % of lithium atoms, where the amount of nitrogen atoms contained is between 0.5 wt. % and 6 wt %, and 80% or more is bonded in carbon-nitrogen single bonds (C—N) or carbon-nitrogen double bonds (C=N) that give rise to x-ray photoelectron spectroscopy intensity peaks corresponding to bonding engergies of 401.2±0.2 eV and 398.8±0.4 eV, the ratio of said intensities being 1.0 or more.

12. The method according to claim 11, where the true density of the anode material is in the range from 1.4 g/cm3 to 2 g/cm$^3$.

13. The method according to claim 1, wherein said anode material has an $d_{002}$ inter-layer spacing of 3.4 Å or more and $Lc_{002}$ crystallite size of 70 Å or less.

14. An anode material for a lithium secondary battery made by the method of claim 1.

15. A method of preparing a lithium secondary battery employing a non-aqueous media and having an anode material which comprises providing a mixture of a lithium salt and an precursor organic compound for calcining to obtain an anode material and each present in amounts to provide the anode material, calcining the mixture under conditions to obtain the anode material, and then assembling the lithium secondary battery using the anode material.

16. A lithium secondary battery employing a non-aqueous media wherein the anode material is prepared by providing a mixture of a lithium salt and a precursor organic compound for calcining to obtain an anode material and each present in amounts to provide the anode material and calcining the mixture under conditions to obtain the anode material.

* * * * *